Aug. 14, 1934.  B. S. SNOW  1,970,201
WATER TREATING AND STORAGE APPARATUS
Filed March 21, 1929  5 Sheets-Sheet 1

Inventor:
Barton S. Snow,

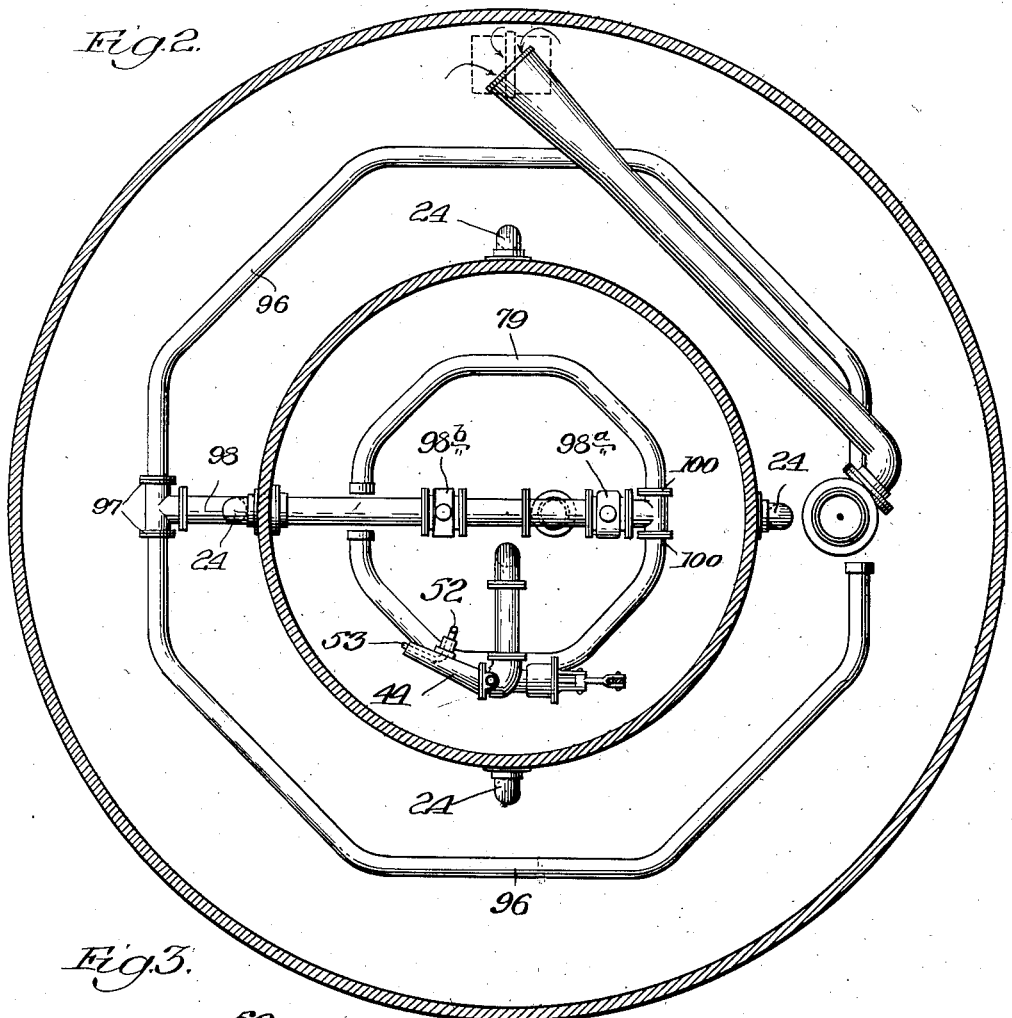
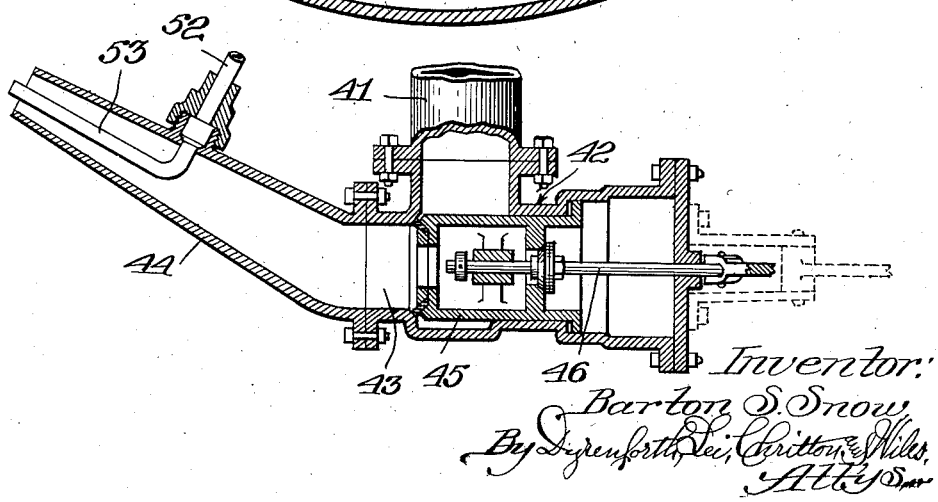

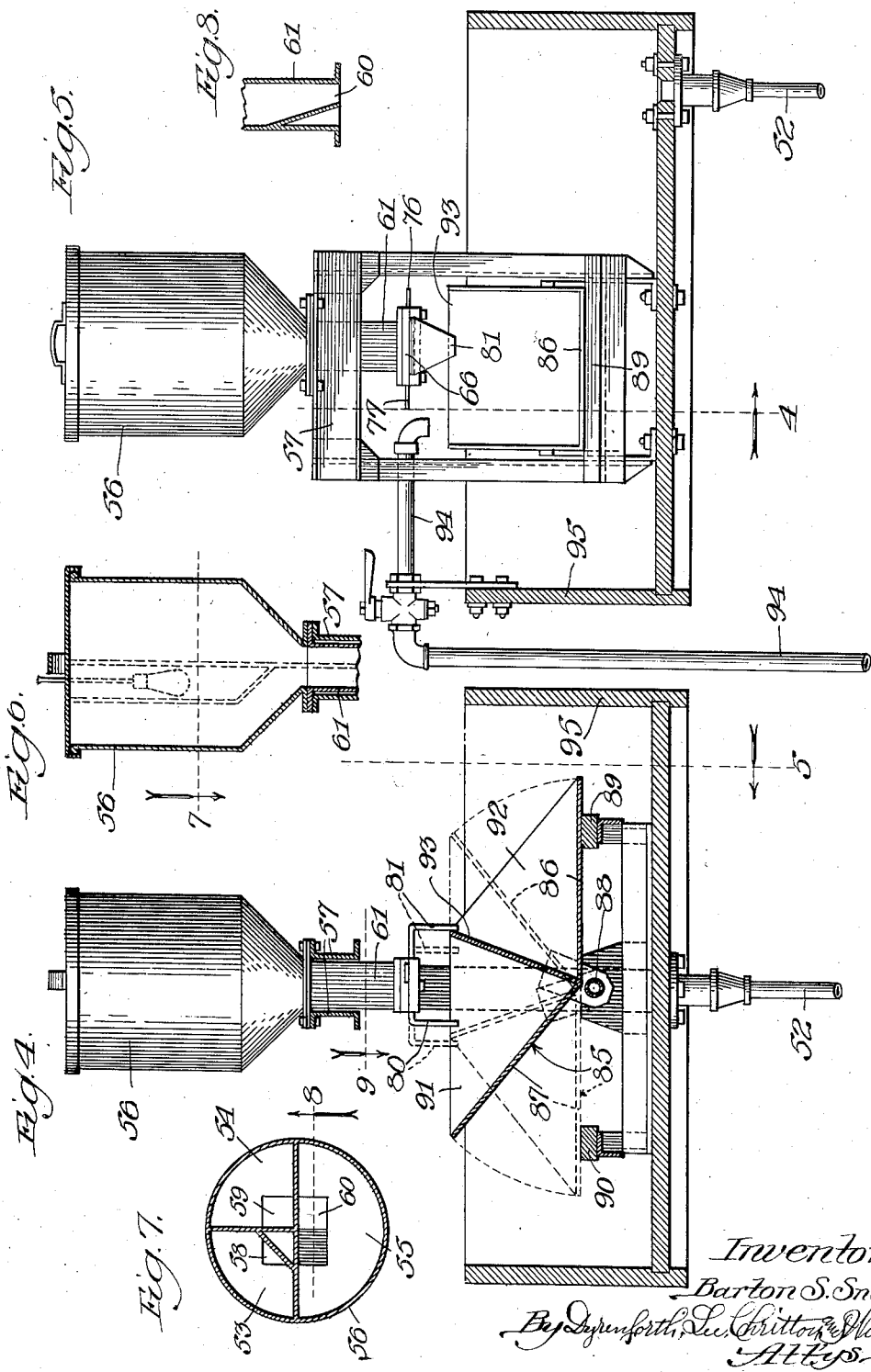

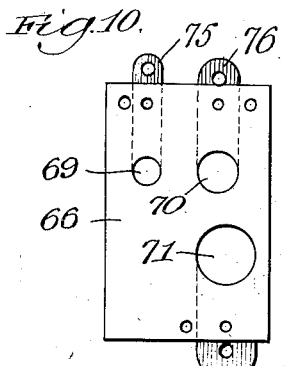
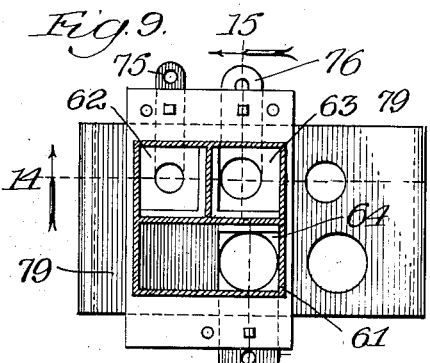
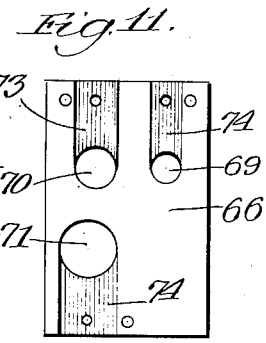
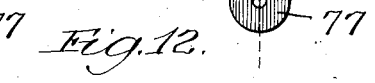
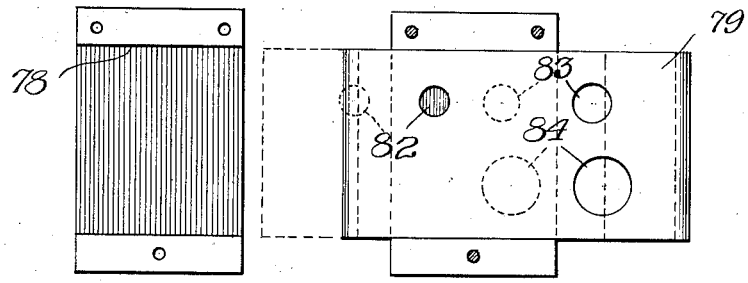
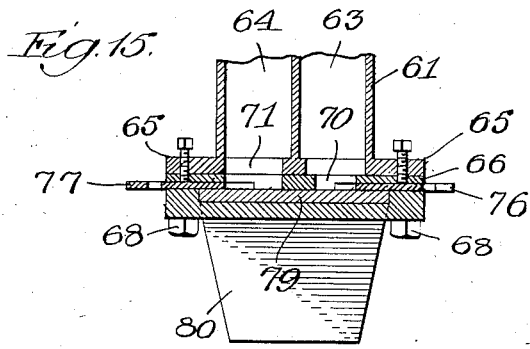

Patented Aug. 14, 1934

1,970,201

UNITED STATES PATENT OFFICE 1,970,201

WATER TREATING AND STORAGE APPARATUS

Barton S. Snow, Wheaton, Ill., assignor to T. W. Snow Construction Company, Chicago, Ill., a corporation of Illinois Application March 21, 1929, Serial No. 348,753

9 Claims. (Cl. 210—10)

My invention relates generally, as to one phase thereof, to the chemical treatment of water to render it "soft" or clarify it, as for example to better it for use in boilers; and as to another phase thereof to such treatment and the storage of the treated water particularly for the supplying of water to locomotive tenders.

Another object is to provide for the exerting of a suction action on the chemical solution to accelerate its travel into the water to be treated and to scavenge the pipe through which the chemical solution periodically discharges.

Another object is to cause the chemicals to effect the ultimate reaction upon the water to be treated in as short a time as possible and without requiring the use of power driven agitators.

Another object is to avoid the maintaining of the chemicals in solution prior to their introduction into the water to be treated, for such a length of time that agitation of the chemical solution is required.

Another object is to minimize danger of error in the feeding of chemicals to the water.

Another object is to prevent the deposit of any of the chemicals into the sludge in the tank with resultant loss and inadequate treatment of the water.

Another object is to permit of the use of the minimum size of tank for the treatment of a given quantity of water for a given length of time, thereby reducing the size of the installation required.

Another object is to effect rapid and uniform mixture of the chemical solution and the water to be treated with resultant complete reaction of the chemicals on the water in a relatively short length of time and quicker clarification, thereby greatly increasing the capacity of the apparatus.

Another object is to provide for such agitation of the water and chemicals that a zone of clear, treated water, will be presented from which water for use may be withdrawn.

Another object is to provide for the incorporation in water storage tanks as installed, of water treating means which will not impose undue stresses on the foundations of the tanks and will provide treating compartments within the clear treated water compartments provided by the tanks proper, the compartments being of such sizes as to allow sufficient time for adequate treatment and clarification of the treated water before discharging into the clear water compartments, and the desired storage capacity for the treated water; and other objects as will be understood from the following description.

Referring to the accompanying drawings:

Figure 2 is an enlarged plan sectional view taken at the irregular line 2—2 on Fig. 1 and viewed in the direction of the arrows.

Figure 3 is an enlarged plan sectional view taken at the line 3 on Fig. 1 and viewed in the direction of the arrow.

Figure 4 is a view in elevation, partly sectional, of the means, forming a part of the installation, for producing the water treating solutions for discharge into the inner, water treating compartment of the apparatus.

Figure 5 is a section taken at the line 5 on Fig. 4 and viewed in the direction of the arrow.

Figure 6 is a broken view in vertical sectional elevation of the plural compartment hopper forming a part of the apparatus of Figs. 4 and 5 for receiving the chemicals with which the water is to be treated.

Figure 7 is a section taken at the line 7 on Fig. 6 and viewed in the direction of the arrow.

Figure 8 is a sectional view in vertical elevation of a detail of the hopper, the section being taken at the line 8 on Fig. 7 and viewed in the direction of the arrow.

Figure 9 is a plan sectional view taken at the line 9 on Fig. 4 and viewed in the direction of the arrow.

Figure 10 is a plan view of a plate through which the chemicals discharge from the hopper for mixture with water to form solutions thereof, this view also showing slide valves for the openings in this plate.

Figure 11 is a bottom plan view of the plate of Fig. 10, with the slide valves omitted.

Figure 12 is a plan sectional view taken at the line 12 on Fig. 14 and viewed in the direction of the arrow, this section line being in the plane of the top of a slide valve controlling the discharge of the chemicals from the hopper.

Figure 13 is a plan view of the plate underlying the slide valve shown in Fig. 12 and in a recess in which this valve is slidable.

Figure 14 is a section taken at the line 14 on Fig. 9 and viewed in the direction of the arrow.

Figure 15 is a section taken at the irregular line 15 on Fig. 9 and viewed in the direction of the arrow.

Figure 1:
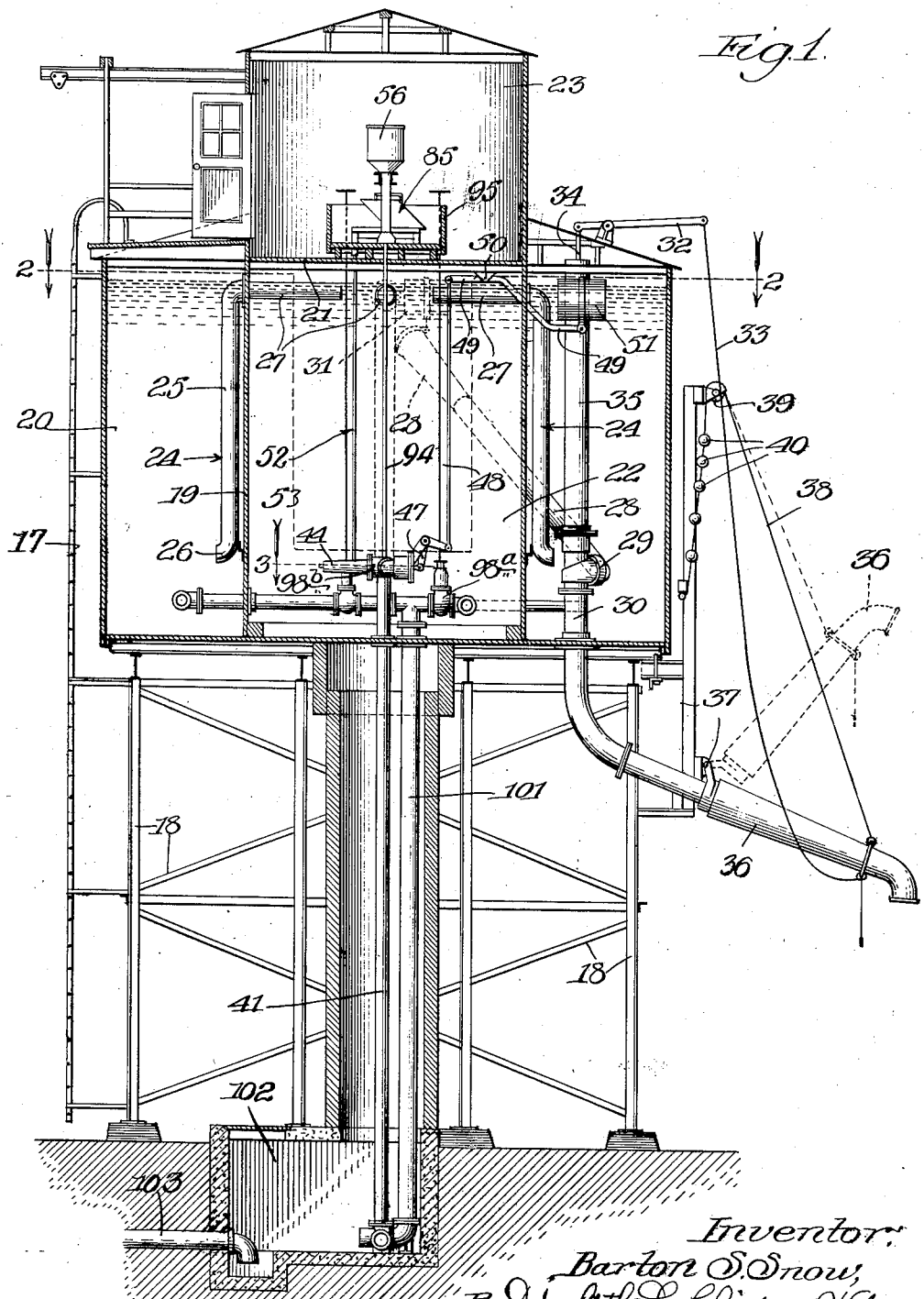
Figure 1 is a view in vertical sectional elevation of a combined water treating and clear water storage apparatus constructed in accordance with my invention.

Referring to the construction shown in Figs. 1 to 15, inclusive, the apparatus comprises a cylindrical tank 17 shown as supported, in accordance with common practice on a sub-frame-work 18, the tank 17 containing a cylindrical tank represented at 19 which is preferably centrally located in the tank 17 and of such size as to form with the tank 17 an annular clear water storage compartment 20. The tank 19 is shown as provided with a horizontal partition 21 dividing the tank into a lower water-treating compartment 22, and an upper compartment 23 in which the apparatus for producing the water-treating solution and hereinafter described is located.

The compartment 22 communicates at its upper portion with the lower portion of the compartment 20 as through the pipes represented at 24, these pipes being formed of vertical portions 25 located within the compartment 20 and having outwardly and laterally deflected outlet portions 26. The upper ends of the pipes 24 terminate in horizontally extending portions 27 which project through openings in the wall of the tank 19 and extend inwardly into the compartment 22 preferably to a point adjacent the center of this compartment. By preference four of the pipes 24 are provided each spaced from the adjacent one thereof at an angle of substantially 90° with the horizontal portions 27 radiating from the vertical center of the compartment 22. The purpose of these pipes is to conduct clarified treated water from the compartment 22, into the lower portion of the compartment 20.

The apparatus shown being provided for the supplying of locomotive tenders with treated water, is provided with a water conducting pipe 28 located in the compartment 20 and swiveled at 29 to a pipe 30 into which it opens. The extremity of the pipe 28 is connected with a float 31 in the compartment 20 which serves to maintain the inlet of the pipe 28 at all times close to the upper surface of the clear water in the compartment 20.

The pipe 30 is equipped with any suitable valve mechanism for controlling the flow of the water therefrom the valve controlling means in the construction shown comprising a lever 32 having a pull cable 33 at one end and connected at its opposite end with a valve actuating rod 34 shown as extending downwardly through an upwardly projecting extension 35 of pipe 30.

The pipe 30 extends downwardly through the bottom of the tank 17 and cooperates with a spout 36 pivoted at 37 on a stationary part of the apparatus which permits the spout 36 through which the water is delivered to the locomotive tender, to be swung from the dotted position represented in Fig. 1, the position occupied by the spout when the apparatus is not in use, to the full line position shown in this figure which is the position occupied by the spout when water is to be discharged into a tender. The spout 36 is shown as counterweighted by a cable 38 connected at one end with the outer end of the spout 36, extending over a pulley 39 stationarily supported, and provided at its other end with counterweighting balls 40.

The pipe through which the raw water is supplied to the compartment 22 is represented at 41 and communicates, under valve control, with a source (not shown) of water under pressure. The pipe 41 opens into a valve device 42 to the outlet 43 of which a nozzle 44 is connected. This nozzle is shown as extending substantially horizontally in the lower portion of the compartment 22 adjacent the side of this compartment and is so disposed, as shown, that the water discharges therefrom tangentially of the wall of the compartment whereby the discharging water causes the body of water in the compartment 22 to swirl therein in a clockwise direction.

The particular illustrated construction of valve mechanism 42 is the same as that disclosed in United States Letters Patent No. 1,583,427, granted to me on the 4th day of May, 1926, and therefore it suffices to say that the flow of water to the nozzle 44 is controlled by the lengthwise movement of the piston member 45 of the valve mechanism which is controlled through the medium of an actuating rod 46 connected with one arm of a bell crank lever 47 the other arm of which is connected with a rod 48 pivoted to a lever 49 fulcrumed at 50 with its outer end extending into the compartment 20 where it is connected with float 51 whereby the water in the compartments 20 and 22 is maintained at a predetermined level.

The water-treating material which is supplied to the water in the compartment 22, also enters the water at the lower portion of this compartment preferably through a pipe 52 which opens into a pipe 53 centrally positioned in the discharge end of the nozzle 44 in spaced relation to the walls of the latter with its outlet end projecting beyond the outlet end of the nozzle 44 whereby the water discharging through the nozzle 44 surrounds a core, so to speak, of the water treating material and exerts suction action on the pipe line 52.

In the apparatus shown the chemicals with which the water is to be treated are supplied to the apparatus in dry condition, the apparatus to this end being provided with hoppers for this purpose from which the chemicals in measured quantities are discharged to solution-producing means from which the water treating solution discharges into the pipe 52. In the arrangement shown the water-treating chemicals, by way of example sodium aluminate, dry soda, and dry lime, are charged into hopper compartments 53, 54 and 55 of a hopper structure 56 shown as supported on a horizontal girder 57 located within the compartment 23 and supported by the shell 19. The hoppers 53, 54 and 55 have separate outlets 58, 59 and 60 grouped about the vertical center of the hopper structure 56 and opening into the upper end of an outlet member 61 containing vertical passages 62, 63 and 64 in registration, respectively, with the outlets 58, 59 and 60. The lower end of the tubular member 61 is provided with oppositely extending horizontal flanges 65. Extending across the bottom of the tubular member 61 is a plate 66, and beneath the plate 66, a plate 67, these plates being rigidly secured together and to the flanges 65 as by the bolts shown at 68. The plate 66 contains openings 69, 70 and 71 positioned in registration with the passages 62, 63 and 64, respectively, as shown in Fig. 9. The underside of the plate 66 contains grooves 72, 73 and 74 leading to the openings 69, 70 and 71, respectively, and in which slide valves 75, 76 and 77 for controlling the effective size of these openings, are slidably adjustable.

The plate 67 contains a slideway 78 in its upper surface in which a slide 79, having depending lugs 80 and 81 at its opposite ends, is located, the slide 79 containing three openings 82, 83 and 84, the opening 82 being provided for registration with the opening 69 in plate 66 when the slide 79 is in the position shown in Figs. 9, 12 and 14, and the openings 83 and 84 being positioned for registration with the openings 70 and 71, respectively, in the plate 66 when the slide 79 is shifted to the left in the figures just referred to.

It may be here stated that the device just described comprises means for alternately discharging a measured quantity of sodium aluminate when the slide 79 is shifted to the left in Fig. 9 and measured quantities of dry soda and dry lime when this slide is shifted to the position shown in Fig. 9. When an opening in the slide 79 registers with an opening in the plate 66 the material in the hopper compartment above it fills such opening in the slide so that when the slide is moved it carries its charge of chemical with it, the chemical dropping from the opening in the slide when the latter moves beyond the edge of the plate 66, it being understood that a charge of sodium aluminate is discharged from the slide 79 upon the movement of the latter to the left in Fig. 9 and that charges of dry soda and dry lime are discharged from this slide when the latter moves to the position shown in Fig. 9.

The solution producing apparatus also comprises a tiltable receptacle 85 which, by way of example, may be of the common form shown, its bottom being formed of plate portions 86 and 87 extending at an oblique angle to each other. The receptacle 85 is pivoted as represented at 88 and is adapted to rock from the full line position shown in Fig. 4 wherein it rests at its bottom portion 86 upon a stop 89, to the dotted line position represented therein in which position it rests upon a stop 90.

The receptacle 85 is divided into two substantially equal-volume compartments 91 and 92 by an upwardly extending partition 93, and is rocked from one of the said positions to the other thereof by the charging into the uppermost one of these compartments, of water supplied thereto through a pipe represented at 94 and shown as opening into the pipe 41 through which the water is supplied to the compartment 22 as hereinbefore explained. The discharge of the pipe 94 is so positioned, as shown, that when the tilting receptacle 85 is in the full line position shown in Fig. 4 water will flow into the compartment 91, and when this receptacle swings to the dotted line position shown in this figure the water will flow into the compartment 92, it being understood that the contents of these compartments discharge therefrom alternately in the rocking movements of the receptacle 85 and enter a tank 95 in which the receptacle 85 is located, this tank communicating with the upper end of the pipe 52.

The arrangement of the parts described is such that the slide 79 is reciprocated by the engagement of the partition 93 alternately with the lugs 80 and 81 of this slide. In the movement of the receptacle 85 to the full line position shown in Fig. 4, the partition 93 engages the lug 81 shifting the slide 79 to the right in this figure with the result of discharging measured quantities of dry soda and dry lime into the compartment 91 for mixture with the water flowing into this compartment through the pipe 94. As soon as this compartment fills with a sufficient amount of water to overbalance the opposite end of the receptacle 85, the latter swings to the dotted position shown in Fig. 4 discharging the solution of soda and lime into the tank 95 from which it discharges through the pipe 52 to the jet nozzle 44, as above explained. In this movement of the receptacle 85 the partition 93 engages the lug 80 of the slide 79 shifting the latter to the dotted position shown in Fig. 4 whereupon a charge of sodium aluminate is dumped from the slide into the compartment 92 which in this position receives water from the pipe 94, remaining in this position until the overbalancing effect of the water in this compartment rocks the receptacle 85 to the full line position shown in Fig. 4 whereupon the solution of sodium aluminate discharges into the tank 95 and thence through the pipe 52.

It will be understood from the foregoing that by the arrangement described I am enabled not only to use chemicals supplied to the apparatus in dry condition, which is of great advantage, but am able to automatically accurately proportion the chemicals supplied to the water to produce substantially uniform treatment without waste of chemicals and regardless of variations in the rate of flow of the water to the nozzle 44 inasmuch as any variations in the rate of flow of water to the nozzle also occur in the pipe 94 and 52. Variations in flow through pipe 94 are exactly followed by variations in periods of discharge of hopper 87, and since the solution discharged by the hopper flows by gravity through the pipe 52, said variations of flow will also be followed by variations in the actual delivery of the water softening material to the tank.

The water and chemical solution, by reason of the tangential jet described, is caused to enter the compartment 22 adjacent its bottom, revolving in a clockwise direction within this compartment and setting up a revolution of all, or practically all, of the contents thereof, the contents revolving at the higher rate adjacent the inner surface of the cylindrical shell 19, whereby thorough agitation of the water and chemicals is effected, the water, thus introduced into the compartment, tending to exert a lifting action on the heavier chemical solution and ensuring complete dissolution of the chemicals and avoiding descent thereof into the sludge zone at the bottom of the compartment 22.

The flow of the water introduced into the compartment 22 being in an upward direction the sludge which forms in the water treating operation must descend downwardly through the incoming water. The sludge at first appears in the form of fine floc comprising gelatinous globules which adhere to each other when they come into contact, these globules as they become larger and heavier tending to gravitate toward the bottom of the compartment. As the speed of movement of the water in compartment 22 is greatest at the outer periphery of the body of water therein, the tendency of the floc in rising is to move outwardly toward the side wall of the compartment 22 and upon reaching the upper portion of the body of water flows inwardly and downwardly toward the center of the tank where the water is more quiet thence gravitating to the bottom of the tank, the above-referred-to action resulting in the provision of a zone of thoroughly treated practically clear water at the top of the body thereof at the center of the tank into which zone the outlet pipes 27 extend.

The apparatus also comprises means for removing the sludge which accumulates on the bottom of the compartments 20 and 22, these means comprising pipes 96 located in the compartment 20 closely adjacent the bottom thereof and connected at 97 with a horizontal pipe 98 extending into the compartments 20 and 22; and pipes 99 located in the compartment 22 adjacent its bottom and connected at 100 with the pipe 98, the latter being connected between its ends with a waste pipe 101 shown as discharging into a well 102 having an outlet pipe 103 leading to any suitable point of discharge as for example a sewer. The pipes 96 and 99 contain openings, respectively, (not shown) at intervals along their length, these openings extending downwardly in the particular arrangement shown and through which the sludge discharges into the pipes 96 and 99 and thence to the pipe 101. Shut-off valves 98ª and 98ᵇ in pipe 98 control the discharge of the sludge through pipes 96 and 99 as desired under the control of the operator.

It will be understood from the foregoing description that by constructing an apparatus in accordance with my invention the water and treating material therefor is caused to be thoroughly and quickly intermixed, without the use of motor driven mechanism with the result that the time required for producing complete reaction of the materials upon the water to properly treat it is reduced to the minimum with resultant increase in capacity of apparatus of a given size. Furthermore, by charging the water-treating chemicals into the apparatus in dry condition the labor required about the apparatus is reduced to the minimum and danger of mistakes by the workmen resulting in failure to supply the water with the desired materials in the desired proportions, is greatly minimized, and the requirement of stirring the concentrated water treating solution necessary in water treating apparatuses commonly provided, is rendered unnecessary.

Furthermore, likelihood of undissolved chemical gravitating into the sludge bed and being lost is avoided due to the fact that the movement of the water in compartment 22 is such that a lifting action is exerted on any such undissolved chemical, which may reach the compartment 22.

Figure 16:
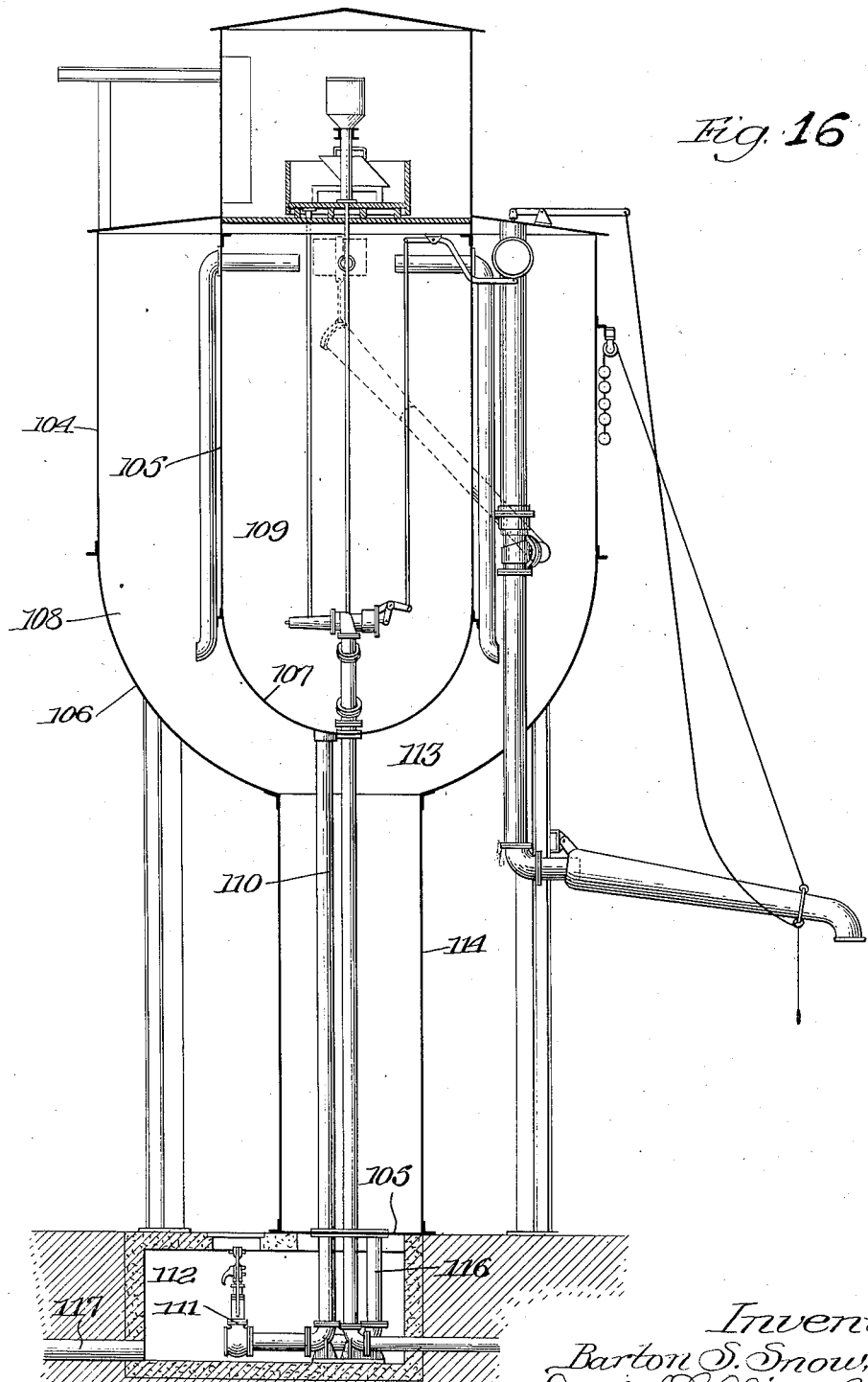
Figure 16, a view like Fig. 1 of a modification of the apparatus therein shown.

Referring to Fig. 16, the construction therein shown constitutes an embodiment of my invention in a tank structure of a form in which its lower end is hemispherical.

In this construction the outer tank 104 and the central tank 105, corresponding with the tanks 17 and 19 of the construction of the preceding figures, have hemispherical lower ends 106 and 107, respectively, the tanks being spaced apart as shown to provide the clear water compartment 108 and the water treating compartment 109.

The supplying of the water to be treated to the compartment 109 and the supplying of the water treating chemicals thereto is the same as in the case of the preceding described construction, as also are the means for delivering from the upper end of the compartment 109 into the lower end of the compartment 108 clarified treated water. The means for withdrawing the clarified treated water from the compartment 108 are also the same as those shown in the preceding figures for withdrawing the clarified water from the compartment 20.

In this particular construction, because of the hemispherical bottoms of the tanks 104 and 105, the provision of piping within the compartments 108 and 109 for the removal of sludge therefrom, is unnecessary, it being sufficient to merely provide openings at the lower portions of the bottoms of these tanks through which the sludge may gravitate. To this end the bottom of the tank 105 contains an opening which communicates with the upper end of a pipe 110 discharging at its shut-off valve-equipped outlet 111 into a well 112; and the bottom of the tank 104 contains an opening 113 which opens into the upper end of a conduit 114 closed at its lower end by a partition 115 except for a portion thereof at which it opens into the upper end of a pipe 116 which is valved as in the case of the pipe 110 and opens into the well 112. A drain pipe 117 opens into the well 112 through which the sludge may be discharged as for example into a sewer.

The principle of operation of this apparatus is substantially the same as in the case of the structure of the preceding figures of the drawings, the water to be treated and the chemical solution being introduced into the compartment 109 at the tangential jet device located adjacent the bottom of this compartment at one side thereof and effecting the rotation of the body of water in the compartment 109 with the result of effecting complete rapid reaction of the chemicals on the water, in a comparatively short length of time and creating a zone of clear water at the top of the compartment 109 adjacent its center from which the treated clear water flows through the outlet pipes into the bottom of the compartment 108.

While I have illustrated and described certain particular constructions embodying my invention, I do not wish to be understood as intending to limit it thereto as the same may be variously modified and altered and the invention embodied in other forms of apparatus, without departing from the spirit of my invention; and in this connection it may be stated that, as to certain features of my invention, if desired, the functions of the two compartments may be reversed, viz, the inner compartment may be used for storing clear, treated, water and the outer compartment used for the treating of the water, in which case the jet nozzle with chemical solution pipe would open into the outer compartment, the outlet for clear water would be located in the inner compartment and the outlet for the water-treating compartment would open from the top of the outer compartment near its inner wall into the bottom of the inner compartment; or if desired the two compartments may be provided as separate tanks as distinguished from one within the other, as for example, arranged side by side, or remote from each other.

What I claim as new, and desire to secure by Letters Patent, is:

1. Water-treating apparatus comprising a tank, a water-conduit discharging into said tank and means for discharging water-treating solution into said tank in a stream centrally of the stream of water discharging through said conduit and at a point beyond the outlet of said conduit.

2. Water-treating apparatus comprising a tank, a water-conduit discharging into said tank in a tangential direction and means for discharging water-treating solution into said tank in a stream centrally of the stream of water discharging through said conduit and at a point beyond the outlet of said conduit.

3. Water-treating apparatus comprising a tank, a water-conduit discharging into said tank, a pipe extending centrally through the outlet of said water-conduit and outwardly beyond said outlet and means for supplying water-treating solution to said pipe.

4. Water-treating apparatus comprising a tank, a water-conduit discharging into said tank in a tangential direction, a pipe extending centrally through the outlet of said water-conduit and outwardly beyond said outlet and means for supplying water-treating solution to said pipe.

5. Water-treating apparatus comprising a tank, a water-conduit discharging into said tank, a pipe extending centrally through the outlet of said water-conduit, and means for supplying water-treating solution to said pipe, the outlet of said pipe being so positioned relative to the outlet of said water-conduit that substantial admixture of the water and solution in said conduit will be avoided.

6. Water-treating apparatus comprising a tank, a water-conduit discharging into said tank in a tangential direction, a pipe extending centrally through the outlet of said water-conduit, and means for supplying water-treating solution to said pipe, the outlet of said pipe being so positioned relative to the outlet of said water-conduit that substantial admixture of the water and solution in said conduit will be avoided.

7. Water-treating apparatus comprising a water-treating tank, a pipe for conducting water into said tank and hydraulically agitating the contents of the tank, said pipe having a restriction, a branch pipe connected with said first named pipe at its high pressure side, and means operated by the water flowing through said branch pipe for automatically regulating the supplying of water-treating material to said tank responsive to the flow of water to the latter.

8. In water treating apparatus the combination of a vertical cylindrical treating tank, a storage tank surrounding, and spaced from, said treating tank, means for delivering water tangentially to the wall of the treating tank but remote therefrom, means for delivering treating material to the water delivery means, and means for withdrawing treated water from the top central portion of the treating tank and delivering it near the bottom of the storage tank.

9. In water treating apparatus the combination of a vertical cylindrical treating tank, a storage tank surrounding, and spaced from, said treating tank, means located adjacent the bottom of the treating tank and remote from its wall for delivering water tangentially thereto, means for delivering treating material to the water delivery means, and means for withdrawing treated water from the top central portion of the treating tank and delivering it near the bottom of the storage tank.

BARTON S. SNOW.